United States Patent
Yang et al.

(10) Patent No.: US 7,826,417 B2
(45) Date of Patent: Nov. 2, 2010

(54) APPARATUS AND METHOD FOR CONTROLLING TRANSMIT POWER OF PREAMBLE SEQUENCE FOR AAS IN OFDMA COMMUNICATION SYSTEM

(75) Inventors: Jang-Hoon Yang, Seongnam-si (KR); Young-Hoon Kwon, Seongnam-si (KR); In-Seok Hwang, Seoul (KR)

(73) Assignee: Samsung Electronics Co., Ltd (KR)

( * ) Notice: Subject to any disclaimer, the term of this patent is extended or adjusted under 35 U.S.C. 154(b) by 431 days.

(21) Appl. No.: 11/263,287

(22) Filed: Oct. 31, 2005

(65) Prior Publication Data

US 2006/0092875 A1 May 4, 2006

(30) Foreign Application Priority Data

Oct. 29, 2004 (KR) .................. 10-2004-0087527

(51) Int. Cl.
 *H04W 4/00* (2009.01)

(52) U.S. Cl. .................. 370/329; 370/328; 370/341; 370/344; 370/343; 455/450; 455/464; 455/509

(58) Field of Classification Search .............. 455/13.4, 455/9, 24, 450, 464, 509; 370/329, 328, 370/341

See application file for complete search history.

(56) References Cited

U.S. PATENT DOCUMENTS

2004/0001429 A1* 1/2004 Ma et al. .................. 370/210

2004/0009783 A1 1/2004 Miyoshi
2005/0013381 A1* 1/2005 Suh et al. .................. 375/260

(Continued)

FOREIGN PATENT DOCUMENTS

EP 1628413 A2 * 2/2006

(Continued)

OTHER PUBLICATIONS

Masoud Olfat et al., "Adaptive Beamforming and Power Allocation for OFDM Over Wireless Networks", Signals, Systems & Computers, 1998.

(Continued)

*Primary Examiner*—Ajit Patel
*Assistant Examiner*—Khai M Nguyen
(74) *Attorney, Agent, or Firm*—The Farrell Law Firm, LLP

(57) ABSTRACT

A method for controlling transmit power of a preamble sequence by a Subscriber Station in an Orthogonal Frequency Division Multiple Access communication system, the system dividing an entire frequency band into a plurality of sub-carrier bands, transmitting a preamble sequence for an Adaptive Antenna System through a predetermined number of sub-carrier bands from among the sub-carrier bands, transmitting a data symbol through remaining sub-carrier bands excluding the sub-carrier bands used for transmitting the preamble sequence. The method includes determining the transmit power used for transmitting the data symbol; and determining the transmit power used for transmitting the preamble sequence to be identical to a preset threshold transmit power when the transmit power of the data symbol is smaller than the threshold transmit power, and determining the transmit power used for transmitting the preamble sequence to be identical to the transmit power of the data symbol when the transmit power of the data symbol exceeds the threshold transmit power.

16 Claims, 7 Drawing Sheets

U.S. PATENT DOCUMENTS

2005/0138671 A1* 6/2005 Love et al. .................. 725/123
2005/0197150 A1* 9/2005 Sarkar et al. ................ 455/522
2005/0239488 A1* 10/2005 Ebiko ......................... 455/522
2006/0040619 A1* 2/2006 Cho et al. .................... 455/69

FOREIGN PATENT DOCUMENTS

JP          2003-32218         1/2003

OTHER PUBLICATIONS

Shiping Duan et al., "Power Allocation for MIMO-OFDM Systems with Multi-user Decoupling and Scheduling", Indoor and Mobile Radio Communications, 2003.

Jisung Oh et al., "Optimum Power Allocation and Control for OFDM in Multiple Access Channels", Vehicular Technology Conference, 2004.

Antonio Pascual-Iserte et al., "On Power Allocation Strategies for Maximum Signal to Noise and Interference Ratio in an OFDM-MIMO System", IEEE Transactions on Wireless Communications, 2004.

* cited by examiner

APPARATUS AND METHOD FOR CONTROLLING TRANSMIT POWER OF PREAMBLE SEQUENCE FOR AAS IN OFDMA COMMUNICATION SYSTEM

PRIORITY

This application claims priority under 35 U.S.C. §119 to an application entitled "Apparatus And Method For Controlling Transmit Power Of Preamble Sequence For AAS In OFDMA Communication System" filed in the Korean Intellectual Property Office on Oct. 29, 2004 and assigned Serial No. 2004-87527, the contents of which are incorporated herein by reference.

BACKGROUND OF THE INVENTION

1. Field of the Invention

The present invention relates to a communication system using an Orthogonal Frequency Division Multiple Access (OFDMA) scheme, and more particularly to an apparatus and a method for controlling transmit power of a preamble sequence for an Adaptive Antenna System (AAS).

2. Description of the Related Art

In a $4^{th}$ generation (4G) communication system, which is the next generation communication system, research is being performed to provide users with services having various Qualities of Services (QoSs) at a high transmission speed. In particular, in the current 4G communication system, research is being performed to support a high speed service for ensuring mobility and QoS in a Broadband Wireless Access (BWA) communication system such as a wireless Local Area Network (LAN) system and a wireless Metropolitan Area Network (MAN) system. Representative communication systems of the 4G communication system are the Institute of Electrical and Electronics Engineers (IEEE) 802.16d communication system and the IEEE 802.16e communication system.

The IEEE 802.16d communication system and the IEEE 802.16e communication system utilize an Orthogonal Frequency Division Multiplexing (OFDM) scheme/an OFDMA scheme to support a broadband transmission network for a physical channel of the wireless MAN system. The IEEE 802.16d communication system considers only a single cell structure and stationary subscriber stations (SSs), which means the system does not accommodate the mobility of the SSs at all. However, the IEEE 802.16e communication system accommodates the mobility of an SS in the IEEE 802.16d communication system.

The IEEE 802.16e communication system expands a cell service area by means of a multi-antenna, and uses a Space Division Multiple Access (SDMA) scheme for increasing the total capacity. In order to use the SDMA scheme, it is necessary to design a preamble sequence so that Channel Quality Information (CQI) of each SS, that is, channel states, can be exactly measured. Further, a Base Station (BS) minimizes inter-beam interference by means of correlation of the preamble sequence, and generates an exact beam based on channel states estimated according to each SS, thereby preventing signals targeting each SS from acting as an interference to other SSs.

FIG. 1 is a diagram schematically illustrating the general structure of an IEEE 802.16e communication system using an SDMA scheme.

Referring to FIG. 1, a BS 101 allocates the same time and frequency resources so that different SSs can simultaneously use the time and frequency resources in both a first space channel transmitted through a first beam 102 and a second space channel transmitted through a second beam 103. In order to allocate the same time and frequency resources to the different SSs, the BS 101 generates a plurality of spatially separated beams.

In order to generate a beam for a downlink, exact uplink channel states are required. Accordingly, the general IEEE 802.16e communication system transmits an AAS preamble sequence to a downlink and an uplink in order to support an AAS, thereby having knowledge of the exact downlink and uplink channel states.

FIG. 2 is a diagram schematically illustrating the general frame structure of an IEEE 802.16e communication system.

Referring to FIG. 2, the frame is classified into a downlink frame 200 and an uplink frame 250. The downlink frame 200 includes a downlink preamble field 211, a Frame Control Header (FCH) field 213, a downlink MAP (DL-MAP) field 215, an uplink MAP (UL-MAP) field 217, a plurality of AAS preamble fields 219, 221, 223 and 227, and a plurality of downlink burst fields, i.e., a first downlink burst field 225, a second downlink burst field 229, a third downlink burst field 231 and a fourth downlink burst field 233.

The downlink preamble field 211 is a field to which synchronization signals (i.e., a downlink preamble sequence) are transmitted in order to acquire synchronization (i.e., transmission/reception interval) between a BS and an SS. The FCH field 213 is a field through which basic information for a sub-channel, such as a ranging, a modulation scheme, etc., is transmitted. The DL-MAP field 215 is a field through which a DL-MAP message is transmitted, and the UL-MAP field 217 is a field through which a UL-MAP message is transmitted. Herein, because Information Elements (IEs) included in the DL-MAP message and the UL-MAP message have no direct connection to the present invention, a detailed description will be omitted. The AAS preamble fields 219, 221, 223 and 227 are fields through which downlink AAS preamble sequences for AAA support are transmitted, and the downlink burst fields 225, 229, 231 and 233 are fields through which downlink data targeting SSs are transmitted.

The uplink frame 250 includes a plurality of AAS preamble fields 251, 253, 255 and 259, and a plurality of uplink burst fields, i.e., a first uplink burst field 257, a second uplink burst field 261, a third uplink burst field 263 and a fourth uplink burst field 265. The AAS preamble fields 251, 253, 255 and 259 are fields through which uplink AAS preamble sequences for AAA support are transmitted, and the uplink burst fields 257, 261, 263 and 265 are fields through which uplink data targeting a BS are transmitted from the SSs.

The BS estimates uplink channel states through the uplink AAS preamble sequences, and generates a downlink beam according to the estimated uplink channel states. In the IEEE 802.16e communication system, the AAS preamble sequences have been defined as different sequences in each space channel, i.e., each beam. However, because the IEEE 802.16e communication system has not proposed a scheme for controlling transmit power used for transmitting the AAS preamble sequence, it is impossible to understand a transmit power relation between the AAS preamble sequence and a data burst. Therefore, normal uplink data decoding is impossible. Accordingly, for the IEEE 802.16e communication system, it is necessary to provide a scheme for controlling transmit power used for transmitting the AAS preamble sequence.

SUMMARY OF THE INVENTION

Accordingly, the present invention has been designed to solve the above-mentioned problems occurring in the prior art, and it is an object of the present invention to provide an apparatus and a method for controlling transmit power of an AAS preamble sequence in an OFDMA communication system.

It is another object of the present invention to provide an apparatus and a method for controlling transmit power of an AAS preamble sequence by considering transmit power of a data burst in an OFDMA communication system.

In order to accomplish the aforementioned object, according to one aspect of the present invention, there is provided a method for controlling transmit power of a preamble sequence by a Subscriber Station (SS) in an Orthogonal Frequency Division Multiple Access (OFDMA) communication system, the OFDMA communication system dividing an entire frequency band into a plurality of sub-carrier bands; transmitting a preamble sequence for an Adaptive Antenna System (AAS) through a predetermined number of sub-carrier bands from among the sub-carrier bands; and transmitting a data symbol through remaining sub-carrier bands excluding the sub-carrier bands used for transmitting the preamble sequence. The method includes determining the transmit power used for transmitting the data symbol; and determining the transmit power used for transmitting the preamble sequence to be identical to the transmit power of the data symbol.

According to another aspect of the present invention, there is provided a method for controlling transmit power of a preamble sequence by a Subscriber Station (SS) in an Orthogonal Frequency Division Multiple Access (OFDMA) communication system, the OFDMA communication system dividing an entire frequency band into a plurality of sub-carrier bands; transmitting a preamble sequence for an Adaptive Antenna System (AAS) through a predetermined number of sub-carrier bands from among the sub-carrier bands; and transmitting a data symbol through remaining sub-carrier bands excluding the sub-carrier bands used for transmitting the preamble sequence. The method includes determining the transmit power used for transmitting the preamble sequence to be identical to a preset threshold transmit power.

According to further another aspect of the present invention, there is provided a method for controlling transmit power of a preamble sequence by a Subscriber Station (SS) in an Orthogonal Frequency Division Multiple Access (OFDMA) communication system, the OFDMA communication system dividing an entire frequency band into a plurality of sub-carrier bands; transmitting a preamble sequence for an Adaptive Antenna System (AAS) through a predetermined number of sub-carrier bands from among the sub-carrier bands; and transmitting a data symbol through remaining sub-carrier bands excluding the sub-carrier bands used for transmitting the preamble sequence. The method including determining the transmit power used for transmitting the data symbol; and determining the transmit power used for transmitting the preamble sequence to be identical to a preset threshold transmit power when the transmit power of the data symbol is smaller than the threshold transmit power, and determining the transmit power used for transmitting the preamble sequence to be identical to the transmit power of the data symbol when the transmit power of the data symbol exceeds the threshold transmit power.

In order to accomplish the aforementioned object, according to still another aspect of the present invention, there is provided an apparatus for controlling transmit power of a preamble sequence by a Subscriber Station (SS) in an Orthogonal Frequency Division Multiple Access (OFDMA) communication system, the OFDMA communication system dividing an entire frequency band into a plurality of sub-carrier bands, transmitting a preamble sequence for an Adaptive Antenna System (AAS) through a predetermined number of sub-carrier bands from among the sub-carrier bands, transmitting a data symbol through the remaining sub-carrier bands excluding the sub-carrier bands used for transmitting the preamble sequence. The apparatus includes a transmit power controller for determining transmit power used for transmitting the data symbol, and determining the transmit power used for transmitting the preamble sequence to be identical to the transmit power of the data symbol; and a mobility estimator for detecting a mobility index of the SS.

According to yet another aspect of the present invention, there is provided an apparatus for controlling transmit power of a preamble sequence by a Subscriber Station (SS) in an Orthogonal Frequency Division Multiple Access (OFDMA) communication system, the OFDMA communication system dividing an entire frequency band into a plurality of sub-carrier bands, transmitting a preamble sequence for an Adaptive Antenna System (AAS) through a predetermined number of sub-carrier bands from among the sub-carrier bands, transmitting a data symbol through the remaining sub-carrier bands excluding the sub-carrier bands used for transmitting the preamble sequence. The apparatus includes a transmit power controller for determining the transmit power used for transmitting the preamble sequence to be identical to a preset threshold transmit power.

According to still another aspect of the present invention, there is provided an apparatus for controlling transmit power of a preamble sequence by a Subscriber Station (SS) in an Orthogonal Frequency Division Multiple Access (OFDMA) communication system, the OFDMA communication system dividing an entire frequency band into a plurality of sub-carrier bands, transmitting a preamble sequence for an Adaptive Antenna System (AAS) through a predetermined number of sub-carrier bands from among the sub-carrier bands, transmitting a data symbol through the remaining sub-carrier bands excluding the sub-carrier bands used for transmitting the preamble sequence. The apparatus includes a transmit power controller for determining the transmit power used for transmitting the data symbol, determining the transmit power used for transmitting the preamble sequence to be identical to a preset threshold transmit power when the transmit power of the data symbol is smaller than the threshold transmit power, and determining the transmit power used for transmitting the preamble sequence to be identical to the transmit power of the data symbol when the transmit power of the data symbol exceeds the threshold transmit power; and a mobility estimator for detecting a mobility index of the SS.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Preferred embodiments of the present invention will be described in detail herein below with reference to the accompanying drawings. In the following description, a detailed description of known functions and configurations incorporated herein will be omitted when it may obscure the subject matter of the present invention.

The present invention provides an apparatus and a method for controlling transmit power of a preamble sequence for an Adaptive Antenna System (AAS) in a communication system, which uses an Orthogonal Frequency Division Multiple Access (OFDMA) scheme, e.g., an Institute of Electrical and Electronics Engineers (IEEE) 802.16e communication system. Specifically, the present invention proposes an apparatus and a method for controlling transmit power of an AAS preamble sequence, which maximizes the efficiency of transmit power resources by controlling the transmit power of the AAS preamble sequence in consideration of a relation with transmit power, of a data burst, i.e., a data symbol. In the present invention, an IEEE 802.16e communication system is described as one example for convenience of description. However, it is apparent to those skilled in the art that other communication systems using the OFDMA scheme may use an apparatus and a method for controlling transmit power of an AAS preamble sequence, which is proposed by the present invention.

Figure 1:
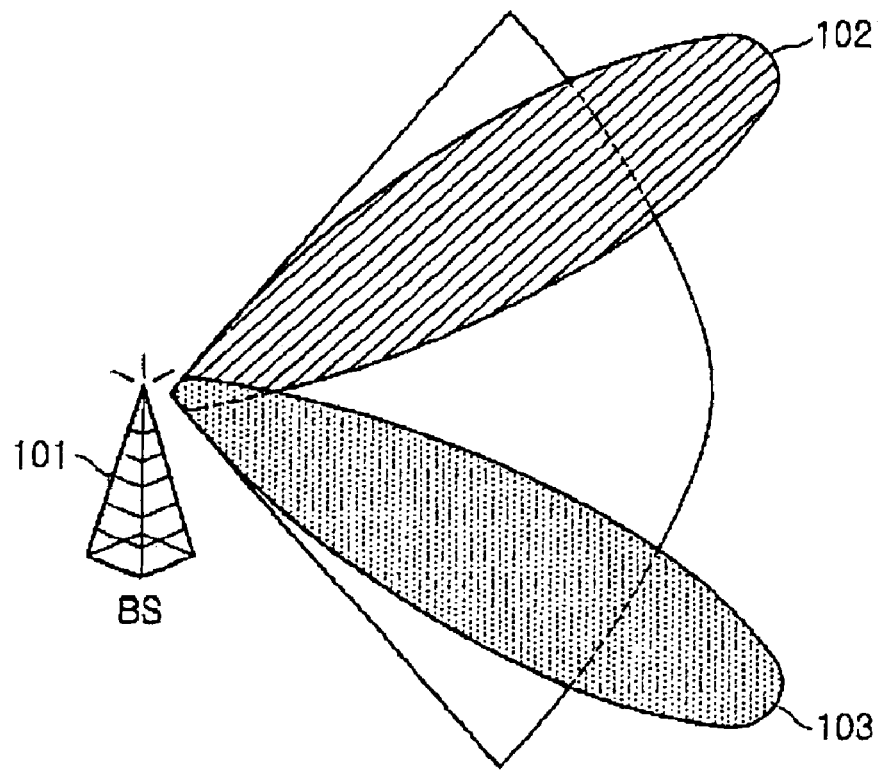
FIG. 1 is a diagram schematically illustrating the general structure of an IEEE 802.16e communication system using an SDMA scheme.
Figure 2:
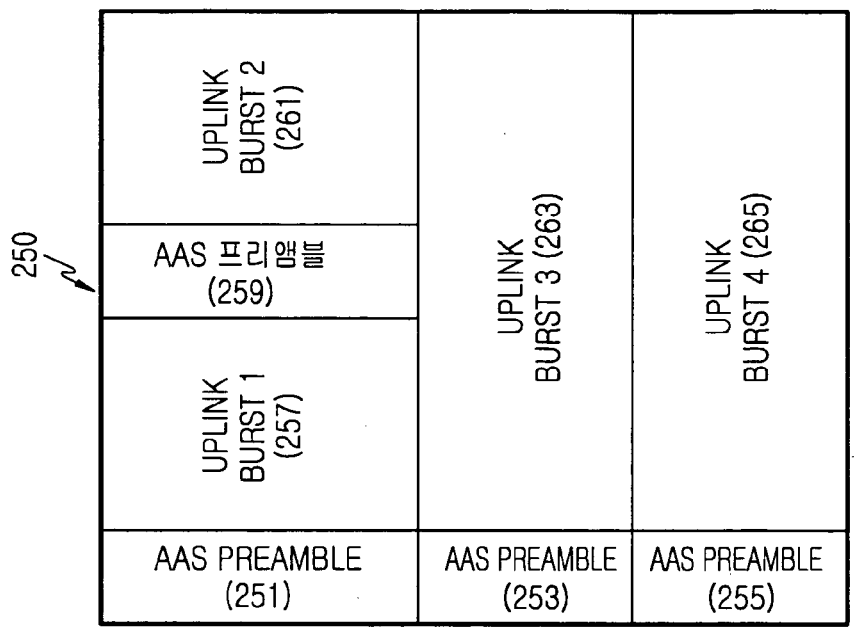
FIG. 2 is a diagram schematically illustrating the general frame structure of an IEEE 802.16e communication system.
Figure 2:
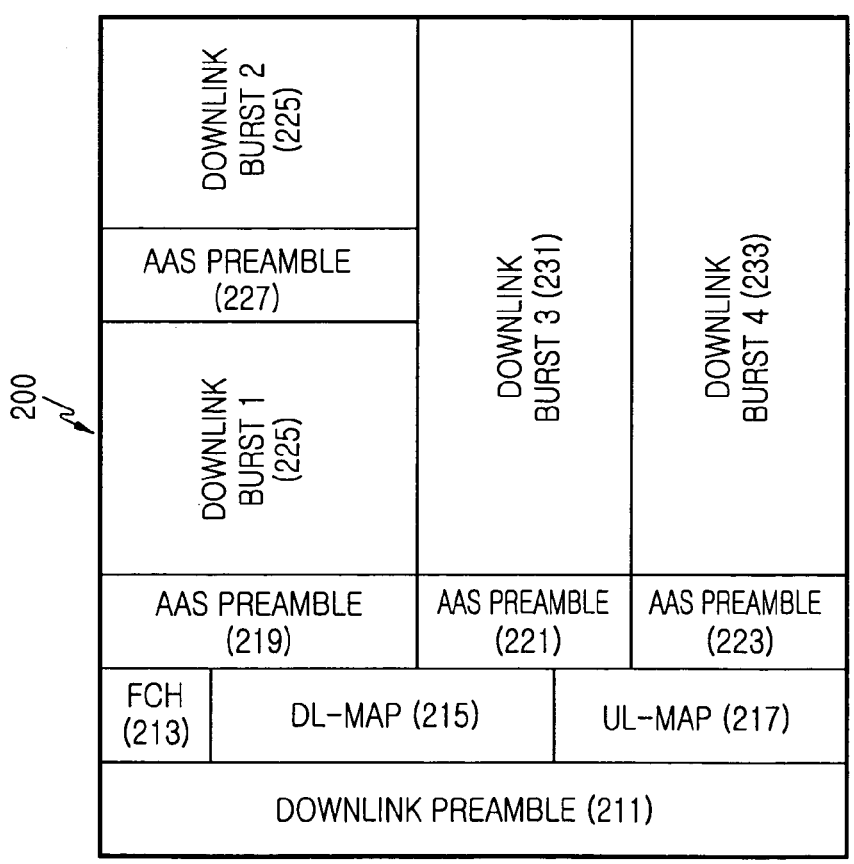

Before a description on the present invention is given, as described in FIG. 2 of the prior art, each of the downlink bursts and each of the uplink bursts in the IEEE 802.16e communication system include a plurality of sub-carriers, respectively. Further, AAS preamble sequences are respectively inserted before the downlink bursts for transmission. Likewise, the same AAS preamble sequences are respectively inserted before the uplink bursts for transmission. Each of the inserted AAS preamble sequences has an Orthogonal Frequency Division Multiplexing (OFDM) symbol length defined in the same sub-carriers. In the IEEE 802.16e communication system, the AAS preamble sequences have been defined as different sequences in each space channel, i.e., each beam.

Hereinafter, AAS preamble sequence transmit power control schemes according to first to third embodiments of the present invention will be described with reference to FIG. 3.

Figure 3:
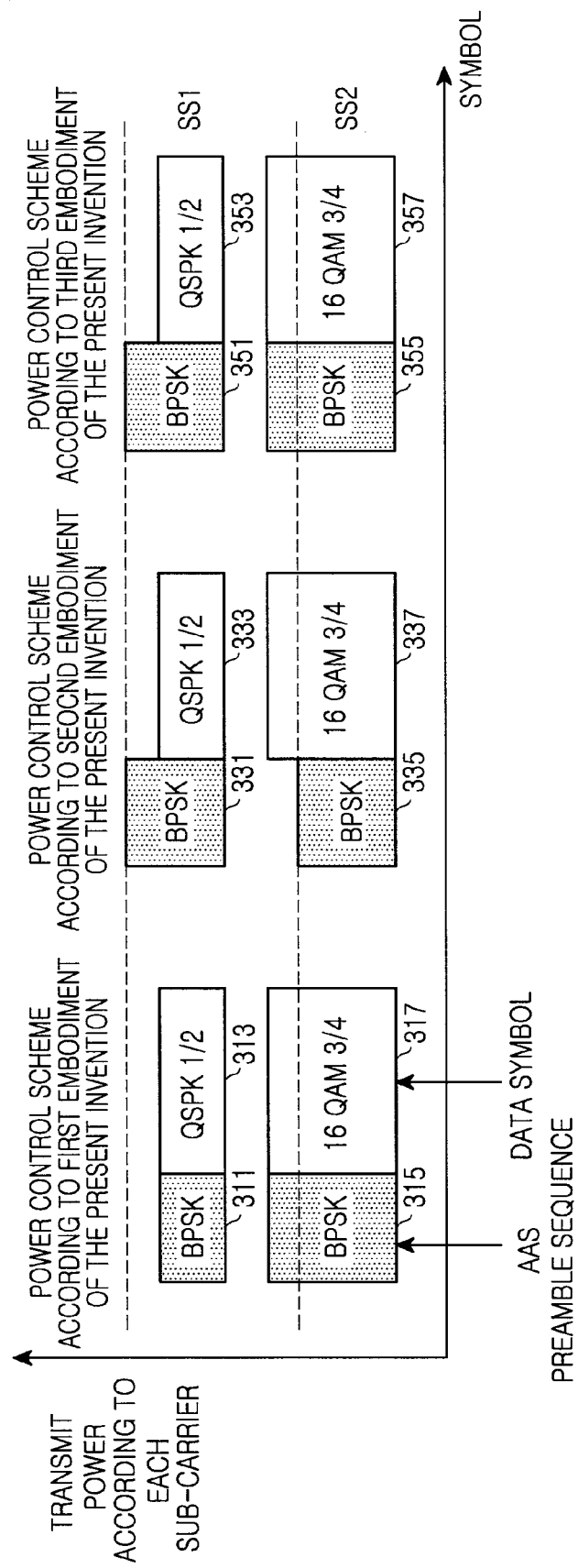
FIG. 3 is a diagram schematically illustrating an AAS preamble sequence transmit power control schemes according to the first to the third embodiments of the present invention.

FIG. 3 is a diagram schematically illustrating the AAS preamble sequence transmit power control schemes according to the first to the third embodiments of the present invention when a Base Station (BS) transmits data to two Subscriber Stations (SSs), i.e., an SS 1 and an SS 2, in an IEEE 802.16e communication system.

First, according to the AAS preamble sequence transmit power control scheme according to the first embodiment of the present invention, the AAS preamble sequence is set to have the same transmit power as that of a data symbol.

Next, according to the AAS preamble sequence transmit power control scheme according to the second embodiment of the present invention, the transmit power of the AAS preamble sequence is set to be always identical to a preset transmit power, i.e., threshold transmit power. That is, in the AAS preamble sequence transmit power control scheme according to the second embodiment of the present invention, the transmit power of the AAS preamble sequence is set independent of transmit power of a data symbol. The threshold transmit power is determined according to a preset Carrier-to-Interference and Noise Ratio (CINR), i.e., a $CINR_{req}$ which is a reception request CINR. Hereinafter, reference CINRs of the OFDMA communication system will be described with reference to Table 1 below.

TABLE 1

| MCS level | $CINR_{req}$ (dB) |
| --- | --- |
| Fast Feedback | 0 |
| CDMA Code | 3 |
| AAS Preamble | 6 |
| Sounding Transmission | 9 |
| QPSK 1/2 | 6 |
| QPSK 3/4 | 9 |
| 16 QAM 1/2 | 12 |
| 16 QAM 3/4 | 15 |

In Table 1, the Modulation and Coding Scheme (MCS) level is generated according to use of an Adaptive Modulation and Coding (AMC) scheme by the OFDMA communication system. Because the generation of the MCS level has no direct connection to the present invention, a detailed description will be omitted. As illustrated in Table 1, the reference CINR defined on an uplink in the OFDMA communication system has a value of 0 dB in case of the fast feedback, 3 dB in case of the Code Division Multiple Access (CDMA) code, 6 dB in case of the AAS preamble sequence, and 9 dB in case of the sounding transmission. Further, the reference CINR has a value of 6 dB when a modulation scheme is the Quadrature Phase Shift Keying (QPSK) scheme and the coding rate is ½, 9 dB when the modulation scheme is the QPSK scheme and the coding rate is ¾, 12 dB when the modulation scheme is the 16 Quadrature Amplitude Modulation (QAM) scheme and the coding rate is ½, and 15 dB when the modulation scheme is the 16 QAM scheme and the coding rate is ¾. The sounding transmission represents that SSs having not received uplink frames transmit sounding symbols in the IEEE 802.16e communication system.

Accordingly, when the AAS preamble sequence transmit power control scheme according to the second embodiment of the present invention is used, the threshold transmit power of the AAS preamble sequence is determined according to the CINR of 6 dB. Likewise, the transmit power of the other data symbols are determined according to the reference CINRs as illustrated in Table 1.

Last, according to the AAS preamble sequence transmit power control scheme according to the third embodiment of the present invention, the transmit power of the AAS preamble sequence is set to be identical to preset transmit power, i.e., threshold transmit power. Then, when the transmit power of a data symbol is smaller than the threshold transmit power, the AAS preamble sequence is set to be identical to the threshold transmit power. However, when the transmit power of the data symbol exceeds the threshold transmit power, the AAS preamble sequence is set to have the same transmit power as that of the data symbol. That is, the AAS preamble sequence transmit power control scheme according to the third embodiment of the present invention is a combination of the AAS preamble sequence transmit power control scheme according to the first embodiment of the present invention and the AAS preamble sequence transmit power control scheme according to the second embodiment of the present invention. In the third embodiment of the present invention, the threshold transmit power is determined according to the reference CINRs having been preset in the IEEE 802.16e communication system as illustrated in Table 1.

Hereinafter, the AAS preamble sequence transmit power control schemes according to the first to the third embodiments of the present invention will be described with reference to FIG. 3.

First, in the AAS preamble sequence transmit power control scheme according to the first embodiment of the present invention, the AAS preamble sequence is set to have the same transmit power as that of the data symbol as described above. Accordingly, the SS 1 sets the AAS preamble sequence 311 modulated by a Binary Phase Shift Keying (BPSK) scheme to have the same transmit power as that of the data symbol 313 modulated by the QPSK scheme and coded at the coding rate of ½. The SS 2 sets the AAS preamble sequence 315 modulated by the BPSK scheme to have the same transmit power as that of the data symbol 317 modulated by the 16 QAM scheme and coded at the coding rate of ¾.

Next, in the AAS preamble sequence transmit power control scheme according to the second embodiment of the present invention, the transmit power of the AAS preamble sequence is set to be always identical to the preset transmit power, i.e., the threshold transmit power, regardless of the transmit power of the data symbol. Accordingly, the SS 1 sets the AAS preamble sequence 331 modulated by the BPSK scheme to have transmit power identical to the threshold transmit power, and the SS 2 sets the AAS preamble sequence 335 modulated by the BPSK scheme to have transmit power identical to the threshold transmit power, i.e., the transmit power of the AAS preamble sequence 331.

Finally, in the AAS preamble sequence transmit power control scheme according to the third embodiment of the present invention, when the transmit power of the data symbol is smaller than the threshold transmit power, the transmit power of the AAS preamble sequence is set to be identical to the threshold transmit power. However, when the transmit power of the data symbol exceeds the threshold transmit power, the AAS preamble sequence is set to have the same transmit power as that of the data symbol. Accordingly, the SS 1 sets the AAS preamble sequence 351 modulated by the BPSK scheme to have transmit power identical to the threshold transmit power, and the SS 2 sets the AAS preamble sequence 355 modulated by the BPSK scheme to have the same transmit power as that of the AAS preamble sequence 357 modulated by the 16 QAM scheme and coded at the coding rate of ¾.

In the AAS preamble sequence transmit power control schemes according to the first to the third embodiments of the present invention, the corresponding transmit power set as the transmit power of the AAS preamble sequence changes when an open loop power control mode is employed, and when a closed loop power control mode and an outer loop power control mode are employed. This will be described with reference to Table 2 below.

TABLE 2

|  |  | AAS preamble sequence | | Data symbol | |
|---|---|---|---|---|---|
|  |  | SS determination | BS determination | SS determination | BS determination |
| First embodiment | Open loop | ○ | X | ○ | X |
|  | Closed loop | X | ○ | X | ○ |
| Second embodiment | Open loop | ○ | X | ○ | X |
|  | Closed loop | X | ○ | X | ○ |
|  | Outer loop | ○ | X | X | ○ |

Table 2 shows a BS and an SS for controlling (i.e., determining) the transmit power of the AAS preamble sequence and the data symbol when the open loop power control mode, the closed loop power control mode, and the outer loop power control mode are used for the AAS preamble sequence transmit power control schemes according to the first and the second embodiments of the present invention. The open loop power control mode represents a mode in which an SS controls its own transmit power by estimating path loss. The closed loop power control mode represents a mode in which a BS controls transmit power of SSs by estimating CINRs of the SSs. The outer loop power control mode represents a mode for finely adjusting transmit power by reflecting a reception error probability of actually received data symbols. The outer loop power control mode may be used together with the open loop power control mode or the closed loop power control mode.

Hereinafter, processes for computing the transmit power of the AAS preamble sequence when the open and the closed loop power control modes are used will be described beginning with the process for computing the transmit power of the AAS preamble sequence when the open loop power control mode is used.

When the open loop power control mode is used, an SS determines the transmit power of an uplink data symbol. In determining the transmit power of the uplink data symbol, the SS uses both an estimated value for uplink propagation path loss and BS reception interference and noise reported by a BS. This may be expressed by Equation (1) below.

$$P(dB_m) = L + CINR_{req} + NI - 10\log_{10}(R) + \text{Offset}_{perSS} \quad (1)$$

In Equation (1), $P(dB_m)$ represents the transmit power of the uplink data symbol according to each sub-carrier, and L represents the estimated value for the uplink propagation path loss and includes a transmit/receive antenna gain. $CINR_{req}$ represents a CINR (i.e., a reference CINR) required for an MCS level of the uplink data symbol, and this has been stipulated in advance between the SS and the BS as described in Table 1. Specifically, both a reference CINR of uplink acknowledge (UL ACK) signals and a reference CINR when a modulation scheme is the QPSK scheme and a coding rate is ⅓ are transmitted to the SS from the BS through a Uplink Channel Descript (UCD) message. In Equation (1), NI represents an estimated value for interference and noise according to each sub-carrier in a receiver of the BS, and is transferred to the SS from the BS through an uplink noise and interference level Information Element (UL Noise and Interference Level IE).

Further in Equation (1), R represents a repetition factor when a repetition code is used. R is considered only when the transmit power of the data symbol is computed, but it is not considered for the transmit power of the AAS preamble sequence. Herein, when the data symbol must be modulated by a QPSK modulation scheme and coded at a coding rate of ¼, the data symbol may be generated through the use of the QPSK modulation scheme and repetition of a coding rate of ½ as illustrated in Table 1. In this case, transmit power according to each sub-carrier is reduced to ½. Further, when an AAS preamble sequence is allocated in more than two symbol intervals and then transmitted, the operation point of the AAS preamble sequence, i.e., the threshold transmit power of the AAS preamble sequence, as described in Table 1 is determined in inverse proportion to symbol intervals transmitting the AAS preamble sequence.

In Equation (1), $Offset_{perSS}$ represents a power compensation value according to each SS. $Offset_{perSS}$ is transmitted from a BS to the SSs through a Power control Mode Change (PMC)_ReSPonse (RSP) Medium Access Control (MAC) message. Further, $Offset_{perSS}$ is a value computed reflecting the reception error probability of received data. When $Offset_{perSS}$ is reflected, it is possible to obtain an effect for the use of the outer loop power control mode as well as the open loop power control mode.

The SS may change $Offset_{perSS}$ as expressed by Equation (2) below.

$$Offset_{perSS} = Offset_{perSS} + UP\_STEP \quad \text{if } NACK \text{ is received} \quad (2)$$

$$Offset_{perSS} = Offset_{perSS} - \frac{1}{1/FER_{target} - 1} \cdot UP\_STEP \quad \text{else if } ACK \text{ is received}$$

$$Offset_{perSS} = Offset_{perSS} \quad \text{elsewhere}$$

$$Offset\_Bound_{lower} - Offset_{perSS} - Offset\_Bound_{upper}$$

In Equation (2), UP_STEP represents an offset increment when an NACK is received; $FER_{target}$ represents a target Frame Error Rate (FER); $Offset\_Bound_{lower}$ represents a lower bound value permitted to $Offset_{perSS}$; and $Offset\_Bound_{upper}$ represents an upper bound value permitted to $Offset_{perSS}$. All of the UP_STEP, the $FER_{target}$, the $Offset\_Bound_{lower}$, and the $Offset\_Bound_{upper}$ are transmitted from a BS to SSs through the UCD message, etc.

Second, the process for computing the transmit power of the AAS preamble sequence when the closed loop power control mode is used will be described.

In the closed loop power control mode, a BS controls the transmit power of an SS. When the closed loop power control mode is used, the BS estimates a CINR whenever receiving an uplink burst such as a ranging code, a CQI, ACK signals and uplink data. The BS changes the estimated CINR into a CINR for the ranging code, and computes the difference between the changed CINR and a reference CINR for the ranging code. This difference may be expressed by Equation (3) below.

$$\Delta P = CINR_{CDMA\_req} - (CINR_{UL} - RangingDataRatio) \quad (3)$$

In Equation (3), $\Delta P$ represents the difference between the CINR of the ranging code changed using the estimated CINR of the uplink burst and the reference CINR for the ranging code. $CINR_{CDMA\_req}$ represents a reference CINR value required when an initial ranging and a periodic ranging are performed, and has been stipulated between the BS and SSs. $CINR_{UL}$ represents a CINR of combined signals when a repetition code is used as a CINR of a received uplink burst. RangingDataRatio represents the difference between a CINR required by an uplink burst to be currently transmitted and a CINR required by a CDMA ranging. $CINR_{UL}$ and RangingDataRatio are transmitted from the BS to the SSs through an UCD burst profile. The BS selectively transmits $\Delta P$ and $\Delta P_i$ to the SSs through a transmit power control command according to the type of an uplink burst used for estimation of $\Delta P$. $\Delta P_i$ represents an $i^{th}$ power compensation value.

When the BS transmits a transmit power control command for controlling the transmit power of an SS as described above, the SS determines the transmit power according to each sub-carrier of an uplink data symbol in response to the transmit power control command received from the BS. This may be expressed by Equation (4) below.

$$P(dB_m) = \quad (4)$$
$$P_{CDMA} + RangingDataRation - 10\log10(R) + \sum_{i \in (last\ CDMA\ ranging)} \Delta P_i$$

In Equation (4), $P(dB_m)$ represents the transmit power according to each sub-carrier of the uplink data symbol, and $P_{CDMA}$ represents the transmit power according to each sub-carrier of a CDMA code determined when an initial ranging and a periodic ranging is performed. R is a value identical to the R in Equation (1), which represents a repetition ratio applied to the current uplink data symbol.

$$\sum_{i \in (last\ CDMA\ ranging)} \Delta P_i$$

represents the total sum of the TPC commands received in an SS after $P_{CDMA}$ is determined in the most recent time period.

In a case in which the AAS preamble sequence transmit power control scheme according to the first embodiment of the present invention is utilized as illustrated in Table 2, when the open loop power control mode is used, an SS determines AAS preamble sequence transmit power and data symbol transmit power. However, when the closed loop power control mode is used, a BS determines the AAS preamble sequence transmit power and the data symbol transmit power.

In a case in which the AAS preamble sequence transmit power control scheme according to the second embodiment of the present invention is utilized, when the open loop power control mode is used, an SS determines the AAS preamble sequence transmit power and the data symbol transmit power. When the closed loop power control mode is used, a BS determines the AAS preamble sequence transmit power and the data symbol transmit power. Further, when the outer loop power control mode is used, the SS determines the AAS preamble sequence transmit power and the BS determines the data symbol transmit power.

In a case in which the AAS preamble sequence transmit power control scheme according to the third embodiment of the present invention is utilized, when the data symbol transmit power is smaller than the preset transmit power (i.e., the threshold transmit power) as described above, the AAS preamble sequence transmit power is controlled in the same manner as the AAS preamble sequence transmit power control scheme according to the second embodiment of the present invention. However, when the data symbol transmit power exceeds the threshold transmit power, the AAS preamble sequence transmit power is controlled in the same manner as the AAS preamble sequence transmit power control scheme according to the first embodiment of the present invention. Consequently, in a case in which the AAS preamble sequence transmit power control scheme according to the third embodiment of the present invention is utilized, when the scheme is performed in the same manner as the AAS preamble sequence transmit power control scheme according to the second embodiment of the present invention, the same operation is performed in the same manner as the AAS preamble sequence transmit power control scheme according to the second embodiment of the present invention as illustrated in Table 2. Further, when the scheme is performed in the same manner as the AAS preamble sequence transmit power control scheme according to the first embodiment of the present invention, the same operation is performed in the same manner as the AAS preamble sequence transmit power control scheme according to the first embodiment of the present invention as illustrated in Table 2. Accordingly, a detailed description will be omitted.

Whether the AAS preamble sequence transmit power control scheme is used in the open loop power control mode or the closed loop power control mode is set in the same manner as in the data symbol transmit power control scheme.

Figure 4:
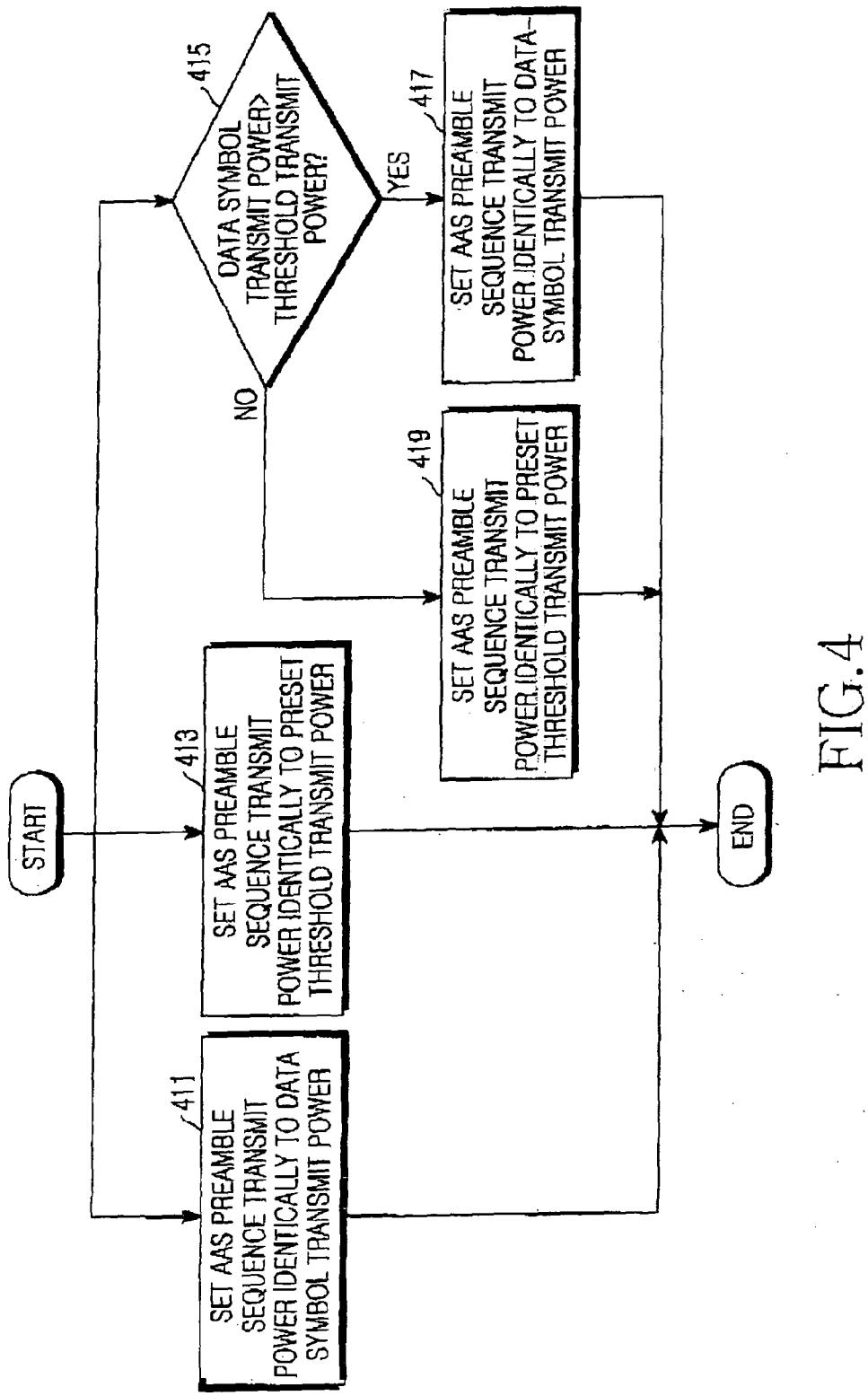
FIG. 4 is a flow diagram illustrating processes for controlling transmit power of an AAS preamble sequence according to the first to the third embodiments of the present invention.

FIG. 4 is a flow diagram illustrating processes for controlling the transmit power of the AAS preamble sequence according to the first to the third embodiments of the present invention.

Referring to FIG. 4, when an SS uses the AAS preamble sequence transmit power control scheme according to the first embodiment of the present invention, the SS sets an AAS preamble sequence to have the same transmit power as that of a data symbol in step 411 and the control process ends. When the SS uses the AAS preamble sequence transmit power control scheme according to the second embodiment of the present invention, the SS sets the AAS preamble sequence to have transmit power identical to the preset threshold transmit power in step 413 and the control process ends.

Further, when the SS uses the AAS preamble sequence transmit power control scheme according to the third embodiment of the present invention, the SS determines if the transmit power of the data symbol exceeds the threshold transmit power in step 415. As a result of the determination, when the transmit power of the data symbol exceeds the threshold transmit power, step 417 is performed. In step 417, the SS sets the AAS preamble sequence to have the same transmit power as that of the data symbol, and the control process ends. However, when the transmit power of the data symbol is smaller than the threshold transmit power, step 419 is performed. In step 419, the SS sets the AAS preamble sequence to have transmit power identical to the threshold transmit power, and the control process ends.

In addition, the transmit power of the AAS preamble sequence and the transmit power of the data symbol are respectively computed according to the power control mode being used, i.e., the open loop power control mode, the closed loop power control mode, or the outer loop power control mode.

Figure 5:
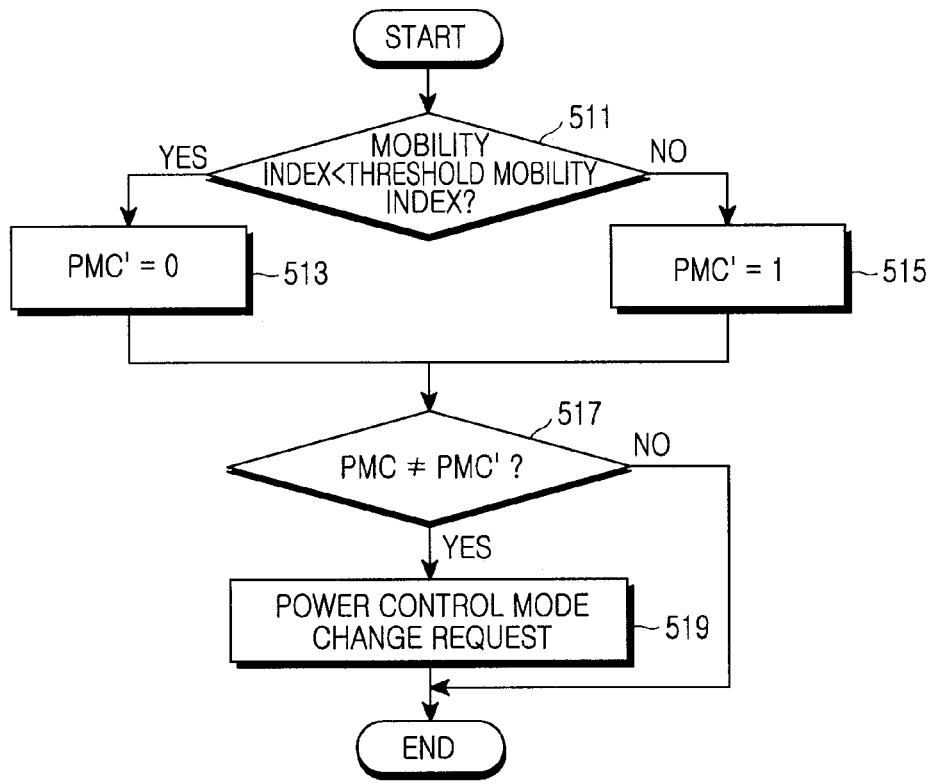
FIG. 5 is a flow diagram illustrating a process by which an SS requests a change of a Transmit Power Control mode while performing processes for controlling transmit power of an AAS preamble sequence according to the first to the third embodiments of the present invention.

FIG. 5 is a flow diagram illustrating a process by which an SS requests a change of a transmit power control mode while performing the processes for controlling the transmit power of the AAS preamble sequence according to the first to the third embodiments of the present invention.

Referring to FIG. 5, the SS determines if the mobility index of the SS is less than a preset threshold mobility index in step 511. The mobility index is a value representing the mobility of the SS, which may be computed by measuring the reception CINR of reference signals such as downlink preamble sequences or uplink pilot signals and considering time change of the measured CINR. When the SS has a small mobility index value, it represents that the SS is relatively less mobile and is stable. Accordingly, the closed loop power control mode having superior performance is used. However, when the SS has a large mobility index value, it represents that the SS is relatively more mobile and is unstable. Accordingly, the open loop power control mode is used.

As a result of determination in step 511, when the SS has the mobility index less than the threshold mobility index, step 513 is performed. In step 513, the SS sets its own power control mode as the closed loop power control mode, sets a variable PMC' (representing a power control mode to be set later) to have a value of 0 (PMC'=0), and then step 517 is performed. Setting the variable PMC' to have a value of 0 represents that the power control mode is to be set as the closed loop power control mode.

As a result of determination in step 511, when the SS has the mobility index larger than the threshold mobility index, step 515 is performed. In step 515, the SS sets its own power control mode as the open loop power control mode, sets the variable PMC' representing the power control mode to be set later to have a value of 1 (PMC'=1), and step 517 is performed. Setting the variable PMC' to have a value of 1 represents that the power control mode is to be set as the open loop power control mode.

In step 517, the SS determines if a variable PMC representing the currently set power control mode has a value different from that of the variable PMC' representing the power control mode to be set later. As a result of determination in step 517, when the variable PMC does not have a value different from that of the variable PMC', the SS maintains the current power control mode, and the process ends. However, when the variable PMC has a value different from that of the variable PMC', step 519 is performed. In step 519, the SS transmits a power control mode change request to a BS because the current power control mode is different from the power control mode to be set later. Then, the process ends.

Figure 6:
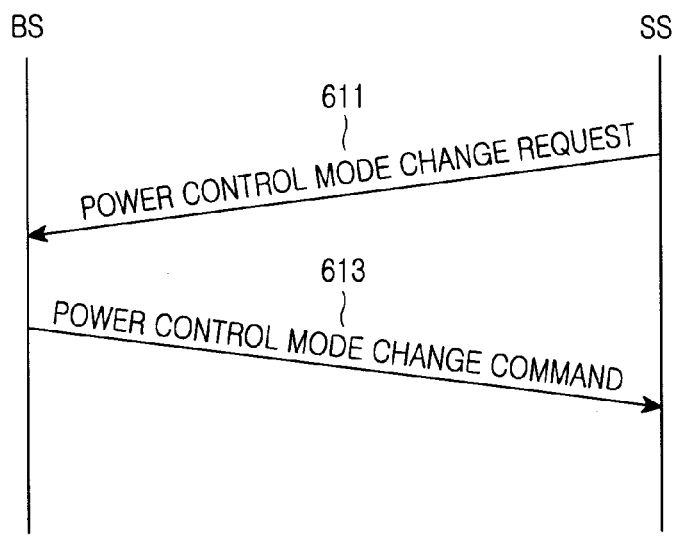
FIG. 6 is a flow diagram illustrating a process for changing a Transmit Power Control mode while performing processes for controlling transmit power of an AAS preamble sequence according to the first to the third embodiments of the present invention.

FIG. 6 is a flow diagram illustrating a process for changing a transmit power control mode while performing the processes for controlling the transmit power of the AAS preamble sequence according to the first to the third embodiments of the present invention.

Referring to FIG. 6, when it is detected that the power control mode must be changed by the scheme as described in FIG. 5, the SS transmits the power control mode change request to the BS (step 611). When the power control mode change request is received from the SS, the BS transmits a power control mode change command to the SS in response to the power control mode change request (step 613). In FIG. 6, a case in which the SS transmits the power control mode change request to the BS is described as one example. However, it is apparent to those skilled in the art that the BS can transmit the power control mode change command to the SS even without the power control mode change request from the SS.

Figure 7:
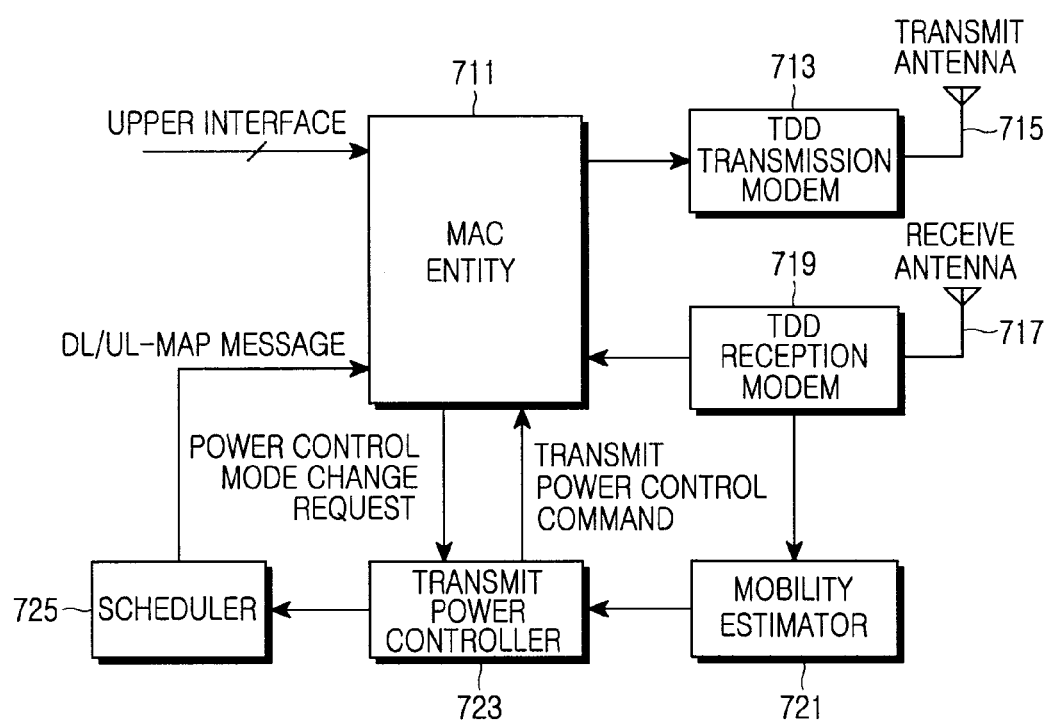
FIG. 7 is a block diagram illustrating the construction of a BS for performing functions in embodiments of the present invention.

FIG. 7 is a block diagram illustrating the construction of the BS for performing functions in the embodiments of the present invention.

Referring to FIG. 7, the BS includes an MAC entity 711, a Time Division Duplex (TDD) transmission modem 713, a transmit antenna Tx ANT 715, a receive antenna Rx ANT 717, a TDD reception modem 719, a mobility estimator 721, a transmit power controller 723, and a scheduler 725.

The MAC entity 711 performs an interface with an upper layer, and outputs a DL-MAP message, an UL-MAP message, etc., which include scheduling information according to scheduling of the scheduler 725, to the TDD transmission modem 713. The DL-MAP message and the UL-MAP message are provided from the scheduler 725. The TDD transmission modem 713 modulates the DL-MAP message, the UL-MAP message, etc., which are output from the MAC entity 711, by an OFDMA scheme; performs an RF processing for the modulated messages; and transmits the processed messages to SSs through the transmit antenna 715.

Signals received from the SSs through the receive antenna 717 are transferred to the TDD reception modem 719. The TDD reception modem 719 down-converts the signals received through the receive antenna 717 into baseband signals, demodulates the baseband signals correspondingly to the OFDMA scheme, and outputs the demodulated baseband signals to the mobility estimator 721. The mobility estimator 721 receives the signals output from the TDD reception modem 719, estimates the mobilities of the SSs, and outputs the mobility indices to the transmit power controller 723.

The transmit power controller 723 generates a power control mode change command with reference to the mobility indices output from the mobility estimator 721, and outputs the power control mode change command to the MAC entity 711. FIGS. 5 and 6 describe a case in which the SSs transmit the power control mode change requests to the BS, and the BS transmits the power control mode change command to the SSs in response to the power control mode change requests of the SSs, thereby changing the power control modes of the SSs. However, it is apparent to those skilled in the art that the BS may also command change of the power control modes of the SSs with reference to the mobility indices of the SSs. The MAC entity 711 outputs the power control mode change command received from the transmit power controller 723 to the TDD transmission modem 713, thereby causing the power control mode change command to be transmitted to the SSs.

When the power control modes of the SSs correspond to the closed loop power control modes, the transmit power controller 723 generates a transmit power control command for controlling the transmit power of the SSs, and outputs the generated transmit power control command to the MAC entity 711. The MAC entity 711 outputs the transmit power control command received from the transmit power controller 723 to the TDD transmission modem 713, thereby causing the transmit power control command to be transmitted to the SSs.

Figure 8:
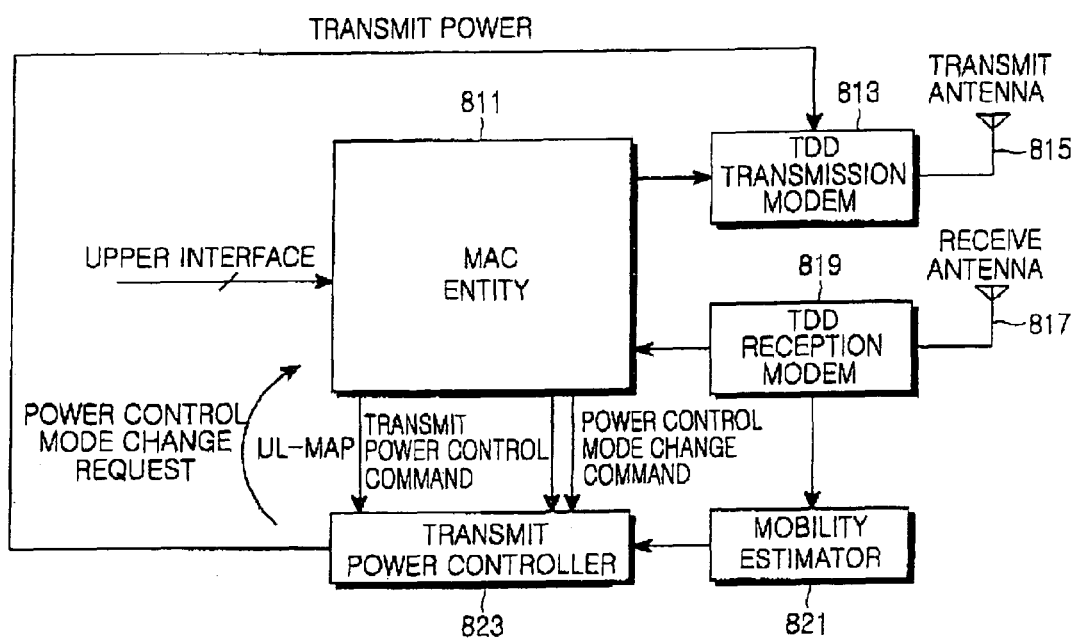
FIG. 8 is a block diagram illustrating the construction of an SS for performing functions in embodiments of the present invention.

FIG. 8 is a block diagram illustrating the construction of the SS for performing functions in the embodiments of the present invention.

Referring to FIG. 8, the SS includes an MAC entity 811, a TDD transmission modem 813, a transmit antenna 815, a receive antenna 817, a TDD reception modem 819, a mobility estimator 821, and a transmit power controller 823.

Signals received through the receive antenna 817, i.e., signals transmitted from the BS, are transferred to the TDD reception modem 819. The TDD reception modem 819 down-converts the signals received through the receive antenna 817 into baseband signals, demodulates the baseband signals correspondingly to the OFDMA scheme, and outputs the demodulated baseband signals to the mobility estimator 821. The mobility estimator 821 receives the signals output from the TDD reception modem 819, estimates the mobilities of the SS, and outputs the mobility indices to the transmit power controller 823.

The transmit power controller 823 determines if it is necessary to change a power control mode with reference to the mobility indices output from the mobility estimator 821. Then, the transmit power controller 823 generates power control mode change request signals based on the results of the determination, and outputs the power control mode change request signals to the MAC entity 811. The transmit power controller 823 determines the transmit power of an AAS preamble sequence according to the AAS preamble sequence transmit power control schemes according to the first to the third embodiments of the present invention, and determines the transmit power of a data symbol. Because an operation by which the transmit power controller 823 determines the transmit power of the AAS preamble sequence has already described, a detailed description will be omitted. The MAC entity 811 outputs the power control mode change request signals received from the transmit power controller 823 to the TDD transmission modem 813, thereby causing the power control mode change request signals to be transmitted to the BS.

As described above, the present invention provides a scheme for controlling the transmit power of an AAS preamble sequence in an IEEE 802.16e communication system (i.e. an OFDMA communication system), thereby enabling exact transmission/reception of signals. Specifically, an AAS preamble sequence transmit power control scheme according to the first embodiment of the present invention can minimize the performance deterioration due to a channel estimation when one SS uses an SDMA scheme at an operation point having a relatively high CINR.

In an AAS preamble sequence transmit power control scheme according to the second embodiment of the present invention, an operation point of an AAS preamble sequence is set as a CINR of an intermediate range used in an IEEE 802.16e communication system, so that channel estimation performance exceeding preset performance can be ensured. Further, when an SDMA scheme is used between SSs using different modulation schemes, a BS receiving an AAS preamble sequence has the same reception power. Accordingly, it is possible to prevent the space channel estimation performance from deteriorating due to the Near-Far phenomenon.

In an AAS preamble sequence transmit power control scheme according to the third embodiment of the present invention, an AAS preamble sequence is maintained so that it has the same transmit power as that of a data symbol, and the AAS preamble sequence is maintained identically to a preset threshold transmit power when the transmit power of the data symbol deteriorates below the threshold transmit power. Accordingly, it is possible to improve the channel estimation performance of an SS having a low operation point and to prevent the channel estimation performance from deteriorating at a relatively high CINR.

While the present invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for controlling transmit power of a preamble sequence by a Subscriber Station (SS) in an Orthogonal Frequency Division Multiple Access (OFDMA) communication system, the OFDMA communication system adapted to transmit an Adaptive Antenna System (AAS) preamble sequence and a data symbol, the method comprising:
- determining a transmit power used for transmitting the data symbol; and
- determining a transmit power used for transmitting the AAS preamble sequence to be identical to the transmit power used for transmitting the data symbol;
- wherein the transmit power used for transmitting the data symbol is determined by at least one of propagation path loss, Carrier-to-Interference and Noise Ratios (CINRs) of the SS, and a reception error probability of received data symbols according to a mobility index of the SS, and
- wherein the mobility index is a value representing mobility of the SS, which is computed by measuring a reception CINR of downlink preamble sequences or uplink pilot signals and considering a time change of the measured reception CINR; and
- wherein, when a power control mode of the SS is an open loop power control mode, the transmit power used for transmitting the data symbol is determined by using both an estimated value for uplink propagation path loss and BS reception interference and noise reported by a BS.

2. The method as claimed in claim 1, further comprising:
- detecting that a power control mode of the SS is changed according to a comparison result of a mobility index of the SS and a preset mobility index while determining the transmit power used for transmitting the data symbol; and
- transmitting a power control mode request to a Base Station (BS).

3. The method as claimed in claim 2, further comprising:
- changing the power control mode of the SS, when a power control mode change command responding to a transmission of the power control mode request is received from the BS.

4. The method as claimed in claim 1, wherein, when a power control mode of the SS is a closed loop power control mode, the transmit power used for transmitting the data symbol is determined corresponding to a transmit power control command received from a BS, and
- wherein the transmit power control command represents that the transmit power used for transmitting the data symbol is determined by using a CINR estimated from the BS whenever a ranging code is received, a Channel Quality Indicator (CQI), Acknowledgement (ACK) signals and uplink data.

5. A method for controlling transmit power of a preamble sequence by a Subscriber Station (SS) in an Orthogonal Frequency Division Multiple Access (OFDMA) communication system, the OFDMA communication system adapted to transmit an Adaptive Antenna System (AAS) preamble sequence and a data symbol, the method comprising:
- comparing a transmit power used for transmitting the data symbol with a preset threshold transmit power;
- determining a transmit power used for transmitting the AAS preamble sequence to be identical to the transmit power used for transmitting the data symbol when the transmit power used for transmitting the data symbol exceeds the preset threshold transmit power; and
- determining the transmit power used for transmitting the AAS preamble sequence to be identical to the preset threshold transmit power when the transmit power used for transmitting the data symbol is less than the preset threshold transmit power;
- wherein the transmit power used for transmitting the data symbol is determined by at least one of propagation path loss, Carrier-to-Interference and Noise Ratios (CINRs) of the SS, and a reception error probability of received data symbols according to a mobility index of the SS, and
- wherein the mobility index is a value representing mobility of the SS, which is computed by measuring a reception CINR of downlink preamble sequences or uplink pilot signals and considering a time change of the measured reception CINR; and
- wherein, when a power control mode of the SS is an open loop power control mode, the transmit power used for transmitting the data symbol is determined by using both an estimated value for uplink propagation path loss and BS reception interference and noise reported by a BS.

6. The method as claimed in claim 5, further comprising:
- detecting that a power control mode of the SS is changed according to a comparison result of a mobility index of the SS and a preset mobility index while determining the transmit power used for transmitting the data symbol; and
- transmitting a power control mode request to a Base Station (BS).

7. The method as claimed in claim 6, further comprising:
- changing the power control mode of the SS, when a power control mode change command responding to a transmission of the power control mode request is received from the BS.

8. The apparatus as claimed in claim 5, wherein, when a power control mode of the SS is a closed loop power control mode, the transmit power used for transmitting the data symbol is determined corresponding to a transmit power control command received from a BS, and
- wherein the transmit power control command represents that the transmit power used for transmitting the data symbol is determined by using a CINR estimated from the BS whenever a ranging code is received, a Channel Quality Indicator (CQI), Acknowledgement (ACK) signals and uplink data.

9. An apparatus for controlling transmit power of a preamble sequence in an Orthogonal Frequency Division Multiple Access (OFDMA) communication system, the OFDMA communication system adapted to transmit an Adaptive Antenna System (AAS) preamble sequence and a data symbol, the apparatus comprising:
- a transmit power controller for determining a transmit power used for transmitting the data symbol, and determining a transmit power used for transmitting the AAS preamble sequence to be identical to the transmit power used for transmitting the data symbol;
- wherein the transmit power used for transmitting the data symbol is determined by at least one of propagation path loss, Carrier-to-Interference and Noise Ratios (CINRs) of an SS, and a reception error probability of received data symbols according to a mobility index of the SS, and
- wherein the mobility index is a value representing mobility of the SS, which is computed by measuring a reception CINR of downlink preamble sequences or uplink pilot signals and considering a time change of the measured reception CINR; and
- wherein, when a power control mode of the SS is an open loop power control mode, the transmit power used for transmitting the data symbol is determined by using both an estimated value for uplink propagation path loss and BS reception interference and noise reported by a BS.

10. The apparatus as claimed in claim 9, wherein the transmit power controller detects that a power control mode of the SS is changed according to a comparison result of a mobility index of the SS and a preset mobility index while determining the transmit power used for transmitting the data symbol, and transmits a power control mode request to a Base Station (BS).

11. The apparatus as claimed in claim 10, wherein the transmit power controller changes the power control mode of the SS, when a power control mode change command responding to a transmission of the power control mode request is received from the BS.

12. The apparatus as claimed in claim 9, wherein, when the power control mode of the SS is a closed loop power control mode, the transmit power used for transmitting the data symbol is determined corresponding to a transmit power control command received from a BS, and wherein the transmit power control command represents that the transmit power used for transmitting the data symbol is determined by using a CINR estimated from the BS whenever a ranging code is received, a Channel Quality Indicator (CQI), Acknowledgement (ACK) signals and uplink data.

13. An apparatus for controlling transmit power of a preamble sequence by a Subscriber Station (SS) in an Orthogonal Frequency Division Multiple Access (OFDMA) communication system, the OFDMA communication system adapted to transmit an Adaptive Antenna System (AAS) preamble sequence and a data symbol, the apparatus comprising:

a transmit power controller that compares a transmit power used for transmitting the data symbol with a preset threshold transmit power, determines a transmit power used for transmitting the AAS preamble sequence to be identical to the transmit power used for transmitting the data symbol when the transmit power used for transmitting the data symbol exceeds the preset threshold transmit power, and determines the transmit power used for transmitting the AAS preamble sequence to be identical to the preset threshold transmit power when the transmit power used for transmitting the data symbol is less than the preset threshold transmit power;

wherein the transmit power used for transmitting the data symbol is determined by at least one of propagation path loss, Carrier-to-Interference and Noise Ratios (CINRs) of the SS, and a reception error probability of received data symbols according to a mobility index of the SS, and wherein the mobility index is a value representing mobility of the SS, which is computed by measuring a reception CINR of downlink preamble sequences or uplink pilot signals and considering a time change of the measured reception CINR; and wherein, when a power control mode of the SS is an open loop power control mode, the transmit power used for transmitting the data symbol is determined by using both an estimated value for uplink propagation path loss and BS reception interference and noise reported by a BS.

14. The apparatus as claimed in claim 13, wherein the transmit power controller detects that a power control mode of the SS is changed according to a comparison result of a mobility index of the SS and a preset mobility index while determining the transmit power used for transmitting the data symbol, and transmits a power control mode request to a Base Station (BS).

15. The apparatus as claimed in claim 14, wherein the transmit power controller changes the power control mode of the SS, when a power control mode change command responding to a transmission of the power control mode request is received from the BS.

16. The apparatus as claimed in claim 13, wherein, when a power control mode of the SS is a closed loop power control mode, the transmit power used for transmitting the data symbol is determined corresponding to a transmit power control command received from a BS, and wherein the transmit power control command represents that the transmit power used for transmitting the data symbol is determined by using a CINR estimated from the BS whenever a ranging code is received, a Channel Quality Indicator (CQI), Acknowledgement (ACK) signals and uplink data.

* * * * *